United States Patent
Breton

(10) Patent No.: US 6,859,773 B2
(45) Date of Patent: Feb. 22, 2005

(54) METHOD AND DEVICE FOR VOICE RECOGNITION IN ENVIRONMENTS WITH FLUCTUATING NOISE LEVELS

(75) Inventor: Pierre-Albert Breton, Pessac (FR)

(73) Assignee: Thales, Paris (FR)

( * ) Notice: Subject to any disclaimer, the term of this patent is extended or adjusted under 35 U.S.C. 154(b) by 475 days.

(21) Appl. No.: 09/851,133

(22) Filed: May 9, 2001

(65) Prior Publication Data

US 2002/0035471 A1 Mar. 21, 2002

(30) Foreign Application Priority Data

May 9, 2000 (FR) .......................................... 00 05864

(51) Int. Cl.⁷ .............................................. G10L 15/20

(52) U.S. Cl. ........................ 704/226; 704/246; 704/250

(58) Field of Search ................................ 704/226, 231, 704/233, 236, 239, 246, 250–251, 227, 228, 230, 240, 270, 272; 381/94.1, 94.2, 94.3, 94.7, 71.1, 71.4, 71.12; 708/300, 310, 322, 402, 403

(56) References Cited

U.S. PATENT DOCUMENTS

| | | | | |
|---|---|---|---|---|
| 5,337,251 A | * | 8/1994 | Pastor | 702/70 |
| 5,673,364 A | * | 9/1997 | Bialik | 704/501 |
| 5,706,395 A | * | 1/1998 | Arslan et al. | 704/226 |
| 5,778,342 A | * | 7/1998 | Erell et al. | 704/256 |
| 5,793,891 A | * | 8/1998 | Takahashi et al. | 382/228 |
| 6,026,359 A | * | 2/2000 | Yamaguchi et al. | 704/256 |
| 6,128,594 A | * | 10/2000 | Gulli et al. | 704/244 |
| 6,188,982 B1 | * | 2/2001 | Chiang | 704/256 |
| 6,438,513 B1 | * | 8/2002 | Pastor et al. | 702/191 |
| 6,445,801 B1 | * | 9/2002 | Pastor et al. | 381/94.2 |

FOREIGN PATENT DOCUMENTS

EP    0 918 317    5/1999

OTHER PUBLICATIONS

Yoma et al., "Weighted matching algorithms and reliability in noise cancelling by spectral subtraction," ICASSP '97, vol. 2, pp. 1171–1174, Apr. 1997.*

J.H.L. Hansen, "Analysis and compensation of speech under stress and noise for environmental robustness in speech recognition," Speech Communications, Special Issue on Speech Under Stress, vol. 20 (2), pp. 151–170, Nov. 1996.*

Nestor B. Yoma, et al: "Weighted Matching Algorithms and Reliability in Noise Cancelling by Spectral Subtraction" IEEE International Conference on Acoustics, Speech, and Signal Processing (ICASSP). US, Los Alamitos, IEEE Comp, Soc. Press, pp. (1171–1174), Apr. 21, 1997.

Vaseghi S V et al: "Noise Compensation Methods for Hidden Markov Model Speech Recognition in Adverse Environments" IEEE Transactions on Speech and Audio Processing, US, IEEE Inc. New York, vol. 5, No. 1, pp. 11–21, Jan. 1997.

(List continued on next page.)

Primary Examiner—Susan McFadden
(74) Attorney, Agent, or Firm—Oblon, Spivak, McClelland, Maier & Neustadt, P.C.

(57) ABSTRACT

A method of voice recognition in a noise-ridden acoustic signal comprises a phase of digitizing temporal frames of the noise-ridden acoustic signal, a phase of parametrization of speech-containing temporal frames, a shape-recognition phase in which the parameters are assessed with respect to references pre-recorded in a reference space, a phase of reiterative searching for noise models in the noise-ridden signal frames, a phase of searching for a transition between the new noise model and the old model and, when the noise transition has been detected, a phase of updating the reference space, the parametrization phase including a step of matching the parameters to the new noise model.

19 Claims, 7 Drawing Sheets

OTHER PUBLICATIONS

Hirsch H G et al: "Noise Estimation Techniques for Robust Speech Recognition" Proceedings of the International Conference on Acoustics, Speech, and Signal Processing (ICASSP), US, New York, IEEE, pp. 153–156, May 9, 1995.

Hansen J H L: "Analysis and compensation of speech under stress and noise for environmental robustness in speech recognition" Speech Communication, NL, Elsevier Science Publishers, Amsterdam, vol. 20, No. 1, pp. 151–173, Nov. 1, 1996.

* cited by examiner

METHOD AND DEVICE FOR VOICE RECOGNITION IN ENVIRONMENTS WITH FLUCTUATING NOISE LEVELS

BACKGROUND OF THE INVENTION

1. Field of the Invention

The present method pertains to a method of voice recognition in a sound environment in which the noise level can fluctuate and a device for the recognition of voice in an acoustic signal having a noise that is liable to fluctuate.

The invention therefore pertains to the processing of acoustic signals containing speech picked up in a noise-ridden medium, this noise possibly varying in time. It can be applied especially but not exclusively in the context of voice recognition on board all types of vehicles, for example in the cockpit of an aircraft or inside the body of an automobile. It can also be applied to telephone or radiotelephone communications in noise-ridden environments, for example in urban roads.

The noises in the sound environment in an aircraft cockpit result from engines, air-conditioning, ventilation, onboard equipment and aerodynamic noise. In this application, the noises are variable and highly dependent on the rate of operation of the engines. The noises will not at all be the same when the aircraft is at a standstill, taxiing, taking off, landing or flying at a stabilized cruising speed. The noises are picked up, at least partially, by a microphone into which the pilot or another crew member speaks, and they mask the useful signal, namely the conversations that have to be recognized.

Similarly, the sound environment is not at all the same in an automobile when it is at a standstill or when it is moving. In urban areas, the sound level is highly dependent on automobile traffic.

2. Description of the Prior Art

In the prior art, the simplest voice-recognition systems, which do not take account of noise, comprise at least three units as shown in FIG. 1a. These units are: a speech signal acquisition unit 1, a parametrization unit or parametrization chain 2 and a shape-recognition unit 3.

In the acquisition unit 1, the processed acoustic signal is actually a speech signal picked up by an electroacoustic transducer. This signal is digitized by sampling and chopped up or subdivided into a certain number of frames which may or may not overlap and may or may not have the same duration. In speech processing, it is usual to consider that the stationary operating modes are set up for periods ranging from 10 to 40 milliseconds. It is these time intervals that are called frames. The inter-frame overlapping is recommended because of certain phonemes known as "plosives" corresponding to the sounds "p", "t", "k", "b", "d", "g", which have a duration smaller than that of a frame. A phoneme is the smallest unit present in speech capable, by its presence, of changing the meaning of a word.

In the parametrization unit 2, each frame is associated with a vector of parameters that expresses the acoustic information contained in the frame. There are several methods for determining a vector of parameters. A classic exemplary method is the one using MFCC (Mel frequency cepstral coefficients) type cepstral coefficients.

The parametrization unit 2 shown in FIG. 1 is generic. It brings into play an estimation of the windowed spectral energy and therefore encompasses the MFCC type parametrization chains. It has several modules 21, 22, 23 including the module 21 used to determine the spectral energy of each frame in a certain number of frequency channels Nb or windows. It receives each frame, and for each of these frames, it delivers a spectral energy value or spectral coefficients per frequency channel. The module 22 compresses the Nb spectral coefficients obtained at the module 21 to take account of the behavior of the human auditory system. The module 23 converts the compressed spectral coefficients. These converted compressed spectral coefficients are the parameters of the desired vector of parameters.

The shape-recognition unit 3 itself comprises at least two modules: a shape-recognition module 31 proper and an acoustic reference storage module 32 known as a space of references (hereinafter called a reference space). The module 311 evaluates the series of vectors of parameters coming from the parametrization with respect to references obtained during a learning phase. These references reflect the acoustic fingerprints of each sentence, each word or each phoneme, and more generally each command. At the end of the last frame, which generally corresponds to the end of a command, the correspondence gives either a distance between a tested command and reference commands, the reference command having the shortest distance being recognized, or a probability that the series of vector of parameters belongs to a sequence of phonemes. The digital signals representing a recognized command are transmitted to a user device 4.

The algorithms conventionally used in this phase are, in the former case, of the DTW (Dynamic Time Warping) type or, in the latter case, of the HMM (Hidden Markov Models) type.

However, noise is the main source of error in the voice-recognition process. The processed acoustic signal is the speech signal added to the noise signal. The noise signal masks the speech signal. It leads to a loss of resolution of the voice recognition. The greater the level of noise the greater is the loss of recognition.

To try and overcome the problem of noise, it is possible to introduce a noise-cancellation or noise-suppression processing operation before the spectral energy is determined so as to minimize the noise signal in the processed acoustic signal. This noise-suppression operation can be performed in many ways, especially as explained in the French patent application F. R.-TO 765715. In this patent application, the noise suppression is done on the basis of spectral characteristics of a memorized noise model, and uses a Wiener filter parametrized by the spectral characteristics of the noise model. This patent application explains the automatic and permanent search for the noise model and the noise-suppression step. FIG. 1 shows the acquisition unit 1, the parametrization unit 2 and the shape-recognition unit 3 as in figure 1a but the speech detection unit 7, a noise modelling unit 5 and a noise-suppression unit 6 appear between the acquisition unit 1 and the parametrization unit 2.

However, despite the noise-suppression, the noise-cleansed acoustic signal transmitted to the parametrization unit 2 remains affected by a residual noise having a non-negligible amplitude that disturbs the voice recognition process. The addition of the noise-suppression processing operation is not enough to combat the noise.

It has been sought to use the most robust possible parametrization chains, namely chains that are affected to the least possible extent by noise. Chains of this kind preponderantly process those parts of the acoustic signal carrying the greatest energy. Indeed, the greater the energy value of a component, that less vulnerable will it be to noise. The trade-off for robustness is a loss of sensitivity.

The problem in the applications envisaged is that the noise may vary. Sometimes it may be almost non-existent and sometimes it may be very strong. The processing of the acoustic signal picked up must be very efficient whatever the noise level. An optimum compromise between robustness and sensitivity must be obtained. This is a first difficulty. The problem arises again with greater acuteness if the noise level is very highly variable in very short time spans. This is the case, for example, with automobiles or aircraft which, after being initially at a standstill, start moving.

SUMMARY OF THE INVENTION

The present invention has set itself the goal of achieving real-time parametrization and shape recognition in noise conditions after a transition has been identified in the ambient noise so as to make the voice recognition as robust as possible in the presence of strong noise and as sensitive as possible when noise is inexistent or almost inexistent.

To achieve this goal, the method of voice recognition in a noise-ridden acoustic signal according to the invention comprises:

a phase of digitizing and subdividing the noise-ridden acoustic signal into a sequence of temporal frames, a phase of parametrization of temporal frames containing speech so as to obtain a vector of parameters, per frame, in the frequency domain, this vector of parameters expressing the acoustic contents of the frame, a phase of shape recognition in which the vectors of parameters are assessed with respect to references pre-recorded in a space of references (or reference space) during a preliminary learning phase, so as to obtain recognition by the determining of at least one reference which is closest to the vector of parameters, a phase of reiterative searching for successive noise models in the sequence of temporal frames, a new noise model replacing a current noise model, a noise model comprising several successive frames, wherein the method comprises:

a phase of searching for a noise transition between the new noise model and the current model, and wherein, when the noise transition has been detected, the method comprises a phase of updating the reference space as a function of the new noise model, the parametrization phase including a step of matching the parameters to the new noise model.

More specifically, the phase of searching for a noise transition may comprise a step of searching for an energy incompatibility and/or a step of searching for a spectral incompatibility between the new noise model and the current model, the detection of an incompatibility expressing a noise transition.

The step of searching for an energy incompatibility may include the comparison of the ratio between the mean energy of the new noise model and the mean energy of the current noise model with a low threshold and a high threshold, an energy incompatibility being found if the ratio is outside the interval delimited by the two thresholds.

To avoid excessively frequent matching and updating operations, when the noise is not really inconvenient, the step of searching for an energy incompatibility may also comprise a comparison of the mean energy of the new noise model and the mean energy of the current noise model with an energy floor threshold below which the noise is negligible, the energy incompatibility determined by the comparison of the ratio between the mean energy of the new noise model and the mean energy of the current noise model being ignored when the mean energy of the new noise model and the mean energy of the current noise model are both below the energy floor threshold.

The step of searching for a spectral incompatibility may comprise, on the basis of spectral coefficients respectively expressing the spectral energy of the frames of the current noise model and the spectral energy of the frames of the new noise model in at least one frequency channel, a comparison of the ratio between the spectral coefficients associated with the frequency channel of the new noise model and the spectral coefficients associated with the same frequency channel of the current noise model with a low threshold and a high threshold, a spectral incompatibility being found if the ratio is located outside the interval delimited by the two thresholds.

Again, to avoid excessively frequent updating and matching operations that would not be truly justified, the step of searching for spectral incompatibility may also comprise, for at least one frequency channel, a comparison of the spectral coefficient of the new noise model in this frequency channel and of the spectral coefficient of the current noise model in this frequency channel with a floor spectral coefficient in this frequency channel, namely a floor below which the noise is negligible, a spectral incompatibility determined by the comparison of the ratio between spectral coefficients being ignored when, in this frequency channel, the spectral coefficients of the new model and of the current model are both below the floor spectral coefficient.

The phase of parametrization may comprise a step of determining spectral coefficients, each associated with a frequency channel each expressing a representation of the spectral energy of a frame containing speech in the frequency channel, the parameter-matching step comprising a determining, for each spectral coefficient, of a robustness operator that expresses the confidence to be attached to the spectral coefficients with respect to the noise level, in the same frequency channel, of the new noise model having activated the transition, a weighting of the spectral coefficient with the robustness operator and a determining of the vector of parameters on the basis of the weighted spectral coefficients.

The robustness operator for the parametrization may verify the following relationship:

$$OpRob(B_{i,par}) = \left\{ \max\left(0.25 + \frac{B_{i,par} - P(B_{i,newmod})}{B_{i,par} + 2P(B_{i,newmod})}, 0\right) \right\}^2$$

$B_{i,par}$ being the spectral coefficient and $P(B_{i,newmod})$ being a parameter depending on the noise level of the new noise model having activated the transition, in the frequency channel i.

The phase of updating the reference space may comprise the following operations, on the basis of the basic spectral coefficients each associated with a frequency channel, each expressing the spectral energy of a basic frame obtained during the learning phase:

the determining of a robustness operator for each basic spectral coefficient, this robustness operator expressing the confidence to be attached to the spectral coefficient with respect to the noise level, the weighting of the basic spectral coefficients with the respective robustness operators, and the preparation of the updated references with the weighted spectral coefficients.

The robustness operator for the updating of the reference space may verify the following relationship:

$$OpRob(B_{i,base}) = \left\{\max\left(0.25 + \frac{B_{i,base} - P(B_{i,newmod})}{B_{i,base} + 2P(B_{i,newmod})}, 0\right)\right\}^2$$

$B_{i,base}$ being the basic spectral coefficient and $P(B_{i,newmod})$ being a parameter depending on the noise level of the new noise model having activated the transition, in the frequency channel i.

When the references are prepared on the basis of compressed basic spectral coefficients, in order to gain computation time, the method may convert the compressed basic spectral coefficients into compressed and weighted basic spectral coefficients by using a conversion table.

The conversion table contains non-compressed basic spectral coefficients obtained by application of the reverse of the compression function to the compressed basic coefficients and the method comprises:

a determining of the robustness operator for each of the non-compressed basic spectral coefficients, a weighting of the non-compressed basic spectral coefficients, a compression of the non-compressed and weighted basic spectral coefficients so as to obtain the compressed and weighted basic spectral coefficients.

This method can be applied with references formed by a sequence of temporal frames corresponding to one or more words, this sequence of frames being identified by a series of vectors of parameters, these parameters being obtained by compression of spectral coefficients.

It can also be applied with references formed by a sequence of temporal frames corresponding to one or more phonemes, this sequence of frames being identified by the center and the standard deviation of one or more Gaussian functions, this center and this standard deviation depending on the parameters of the vectors of parameters of the frames.

For better recognition, a phase of noise-suppression in the temporal frames containing speech may take place before the parametrization phase.

The present invention also relates to a system of voice recognition in a noise-ridden acoustic signal for the implementation of the method. The system comprises:

means to acquire the acoustic signal, digitize it and subdivide it into temporal frames, a parametrization chain to translate the temporal frames containing speech into vectors of parameters in the frequency domain, shape-recognition means with a reference space acquired during the learning stage, to assess the vectors of parameters coming from the parametrization chain with respect to the references, so as to obtain recognition by the determination of a reference that most closely approaches the vectors of parameters, means for modelling the noise to reiteratively prepare noise models, a new noise model replacing a current noise model, means for detecting a noise transition between the new noise model and the current noise model, means to match the parametrization chain with the noise of the new noise model having activated the noise transition, means to update the references of the reference space as a function of the noise level of the new noise model having activated the noise transition.

The means used to update the references of the reference space may comprise a first memory space to store the updated references, these updated references having to replace the current references used for shape recognition before the detection of the noise transition, these current references being stored in a second memory space.

The device may also comprise a memory space to store compressed basic spectral coefficients obtained from basic spectral coefficients each associated with a frequency channel, these basic spectral coefficients each expressing the spectral energy of a basic frame coming from the learning stage, a conversion table to convert the compressed basic spectral coefficients into compressed and weighted basic spectral coefficients, each weighted by a robustness operator as a function of the noise level of the new noise model having activated the noise transition and of the basic spectral coefficient to be weighted, these compressed and weighted basic spectral coefficients being used for the updating of the references of the reference space.

It is preferable that the device should comprise means for noise-suppression in the temporal frames containing speech before their parametrization.

BRIEF DESCRIPTION OF THE DRAWINGS

The invention will be understood more clearly and other features and advantages shall appear from the following description, made with reference to the appended figures, of which.

MORE DETAILED DESCRIPTION

Figure 1A:
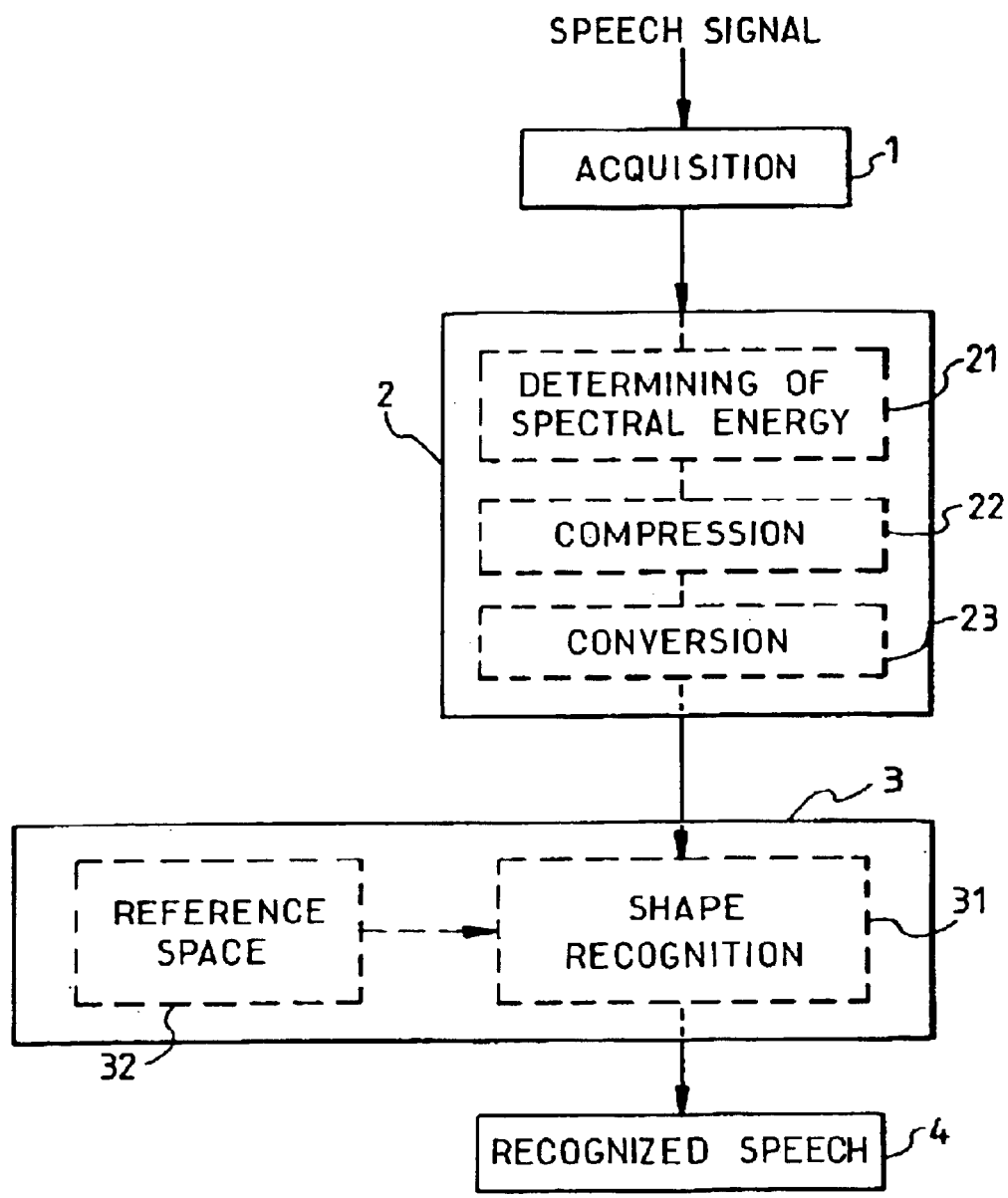
FIG. 1a, 1b (already described) provide a schematic view in the form of block diagrams of two prior art voice-recognition systems, the system illustrated in FIG. 1b including a noise-suppression processing operation.
Figure 1B:
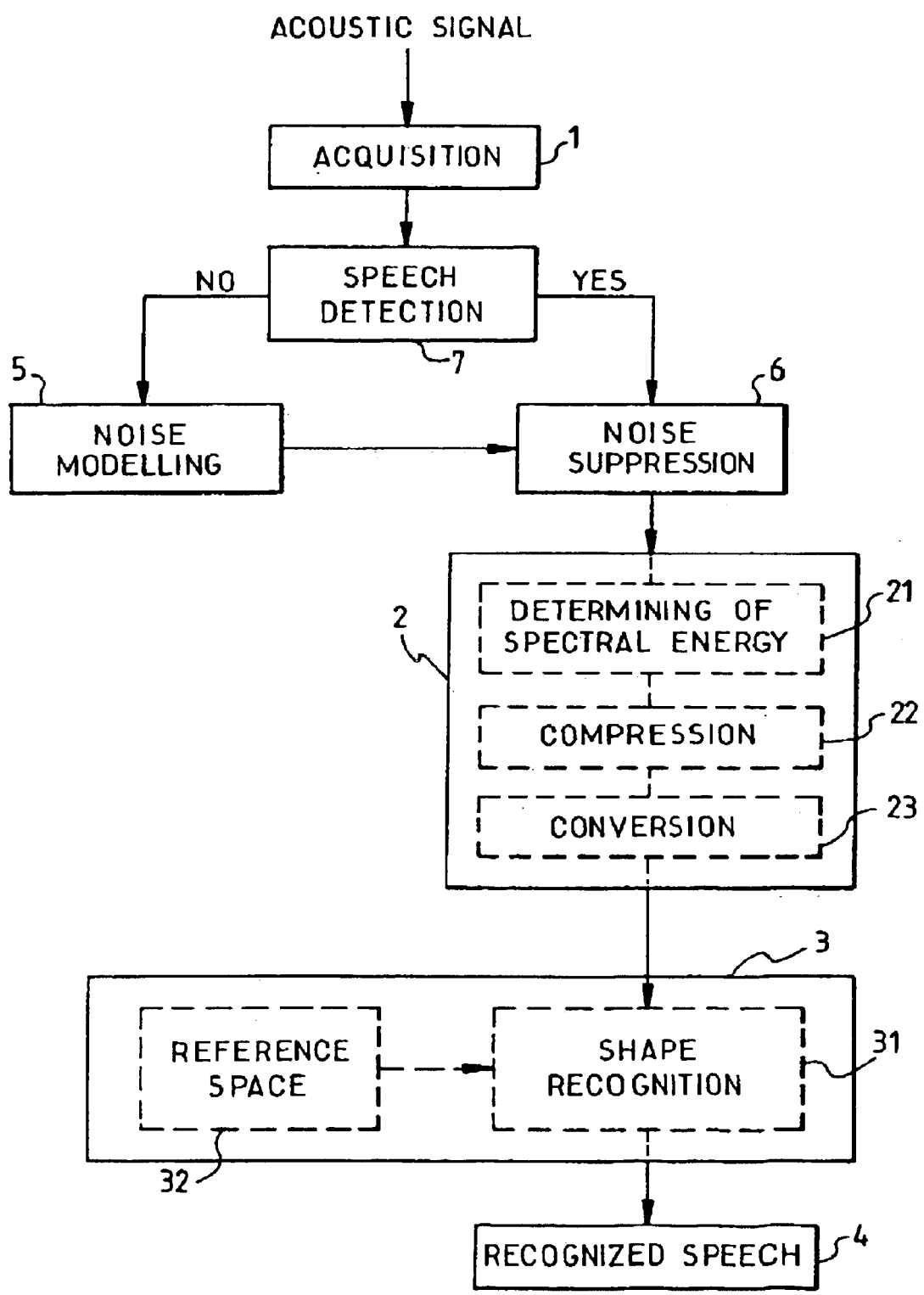
Figure 2:
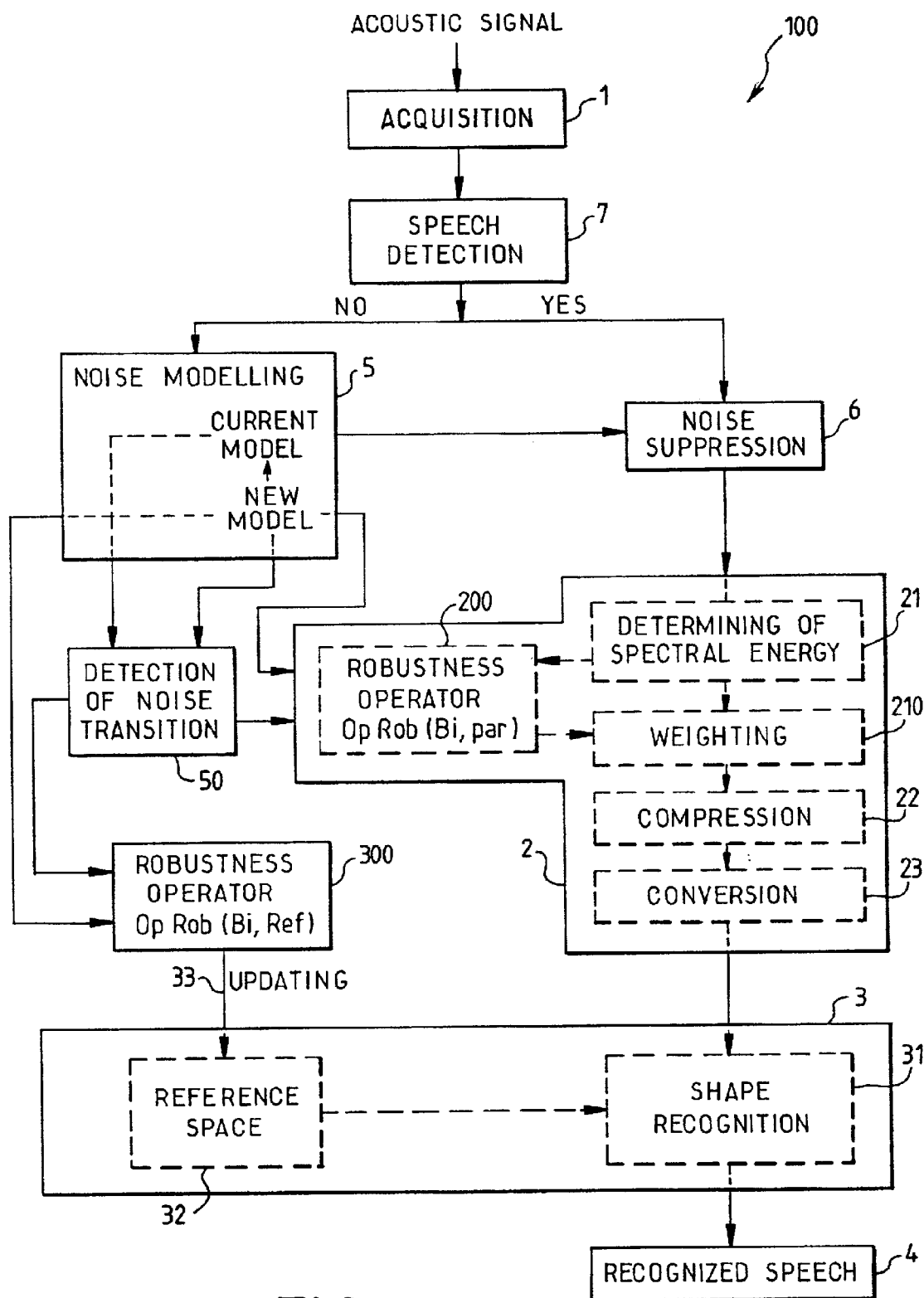
FIG. 2 illustrates a voice-recognition system for the implementation of the voice-recognition method according to the invention.

We shall now refer to FIG. 2 which represents an exemplary voice-recognition system according to the invention. The voice-recognition system referenced 100 receives a temporal acoustic signal at input. This temporal acoustic signal is formed, at least at times, by a useful signal, the speech being sought, to which there is added a noise signal, noise alone or speech alone. FIGS. 1a, 1b show an acquisition unit 1 that receives the acoustic signal, digitizes it by sampling and subdivides it into frames of a plurality of samples. A first module 7, that is standard per se, receives the frames and discriminates between the useful signal and the noise signal in their acoustic signal. The discrimination between speech and noise is a standard and well-known signal-processing operation. Various methods are known and they rely on the following observations. The noise and the speech are superimposed in terms of energy so that an acoustic signal containing speech and ambient noise contains more energy than a noise signal alone. The ambient noise has relatively stable energy that is low in the short term. Speech is most usually preceded by a breathing noise that ceases a few tens of milliseconds to a few hundreds of milliseconds before the first speech transmission so that only ambient noise is found just before the emission of speech. The spectra of certain phonemes, especially phonemes corresponding to vowels and to voiced consonants, possess a characteristic periodicity.

When speech is detected, the useful signal frames, which contain both the speech to be recognized and the ambient noise, are sent to the parametrization module 2 which shall be described hereinafter. Before starting the effective parametrization, it is possible to provide for a noise-suppression processing operation illustrated by the unit 6 described hereinafter. Then, the voice-recognition chain contains the shape-recognition unit 3 that delivers the recognized speech 4. This shape-recognition unit includes the reference space 32.

At output of the speech detection unit 7, the noise frames alone are isolated and sent to a noise modelling module 5. The preparation of a noise module from a noise-ridden signal is standard per se. A method of reiterative searching for noise models that is particularly well suited to the main applications according to the voice-recognition system of the invention is described in the French patent application FR-2 765 715.

A noise model is formed by successive frames whose energy is substantially the same and is below a threshold.

The automatic and reiterative search for a noise model consists of the analysis of the successive frames so as to find N successive frames whose energy values are close to one another. For this purpose, a search is made to find out if the ratio between the signal energy contained in one frame and the signal energy contained in a neighboring frame is within a specified range of values. When a succession of frames such as this has been found, the numerical values of all the samples of these frames are stored. This set of numerical values constitutes a current model. The analysis of the frames continues in order to find a new model that is more suitable, either because it expresses the ambient noise better or because the ambient noise has changed. If at least N other successive frames meeting the same energy stability conditions are found, the mean energy of this new succession of frames is compared with the mean energy of the current model, and if the ratio between the mean energy of the new succession and the mean energy of the current model is smaller than a replacement threshold, preferably slightly greater than one, the new succession of frames constitutes a new model that will be stored and will replace the current model. The mean energy of a noise model is equal to the sum of the energy values of the N frames that constitute it divided by N.

If the noise evolves slowly, the evolution of the noise is taken into account through the replacement of the models by the fact that the replacement threshold is greater than one. However, if the noise evolves speedily in the rising direction, there is a risk that the change will not be taken into account if it is not planned to reinitialize the search for a noise model from time to time. For example, in the application to aircraft, at takeoff, the noise model should not remain fixed in the state in which it was when the aircraft was at a standstill owing to the fact that a noise model is replaced only by a model with a lower energy value. A simple reinitialization consists in replacing a current model, from time to time, by a new model independently of the comparison of the mean energy values of the current model and of the new model.

As in the prior art, the current model is used in the noise-suppression phase illustrated in the unit 6. This unit 6 receives the acoustic signal containing the useful signal and the noise signal. The noise suppression can be done by working on the Fourier transforms of the acoustic signal in which noise is to be suppressed. The Fourier transform of the acoustic signal in which noise is to be suppressed is done frame by frame and gives, for each frame, samples each associated with a frequency channel. These samples are preferably filtered in a Wiener filter. The Wiener filter has as many coefficients as it has frequency channels. Each sample is multiplied by the respective coefficient of the filter. The coefficients are computed from the spectral density of the noise-ridden acoustic signal and the spectral density of the noise model. The samples of a frame multiplied by the corresponding coefficient form the frame in which the noise has been suppressed.

However, now the modelling of the noise is also used to match the parametrization to the noise and update the reference space as a function of the noise. The unit 50 is used to identify a change in the ambient noise that justifies an updating of the reference space and a modification of the parametrization chain as soon as the speech is detected. In the unit 50, a noise transition is detected between the new noise model and the current noise model. The detection of the noise transition comprises a step of searching for an energy incompatibility and/or spectral incompatibility between the new noise model and the current model.

An energy transition occurs when the general level of the noise increases or falls. A spectral transition occurs when the shape of the spectrum changes without the mean energy value being necessarily modified to any substantial extent.

Figure 3A:
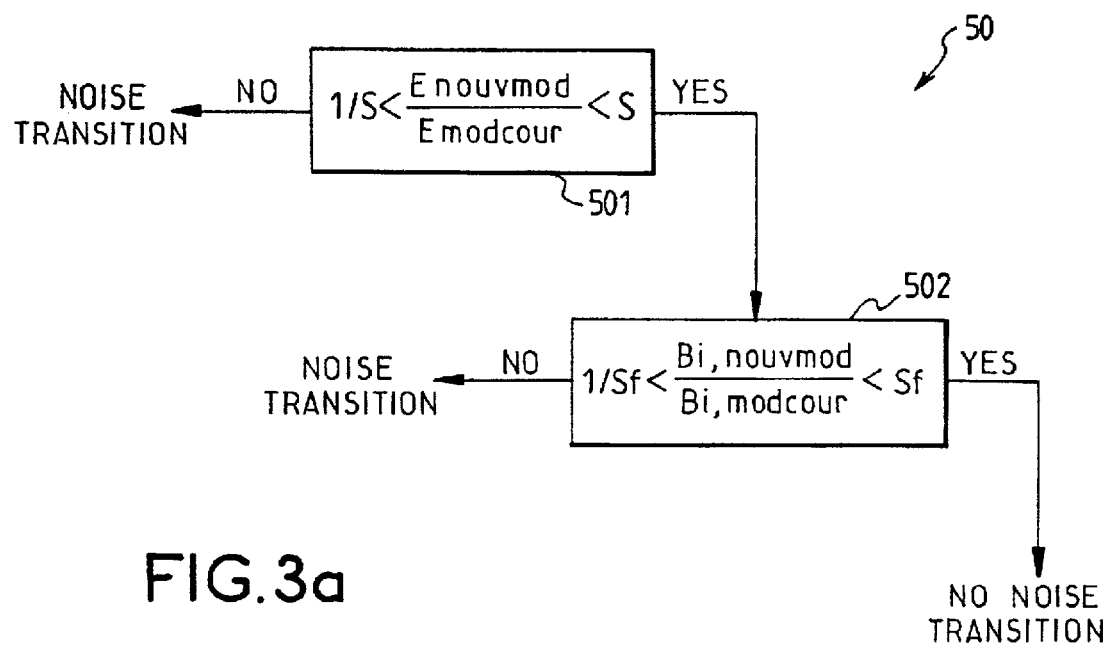
FIGS. 3a, 3b illustrate the detection of the noise transition.

Reference is now made to FIG. 3a. To decide on the energy incompatibility of the unit 501, the mean energy $E_{newmod}$ of the new noise model is compared with the mean energy $E_{modcurr}$ of the current noise model. The current noise model is used in the parametrization in progress so long as the noise transition is not detected. The ratio between the two mean energy values $E_{newmod}/E_{modcurr}$ is computed. The rule is as follows: if this ratio is outside the interval delimited by two thresholds S and S', of which one threshold S is greater than 1 and the other threshold S' is smaller than 1, then there is incompatibility between the two models. A noise transition is detected. The two thresholds S and S' will preferably be inverted with respect to each other, S'=1/S, and in fact the determining of only one of these two thresholds will suffice. For example, a typical value is S=4 and therefore S'=0.25. The value of the threshold is used to fix the frequency of detection of the transitions and hence the frequency of modification of the parametrization chain and the updating of the reference space. It is sought to avoid an excessively great frequency which would impose a reference space updating flow that would be incompatible with the available computing power. If an energy incompatibility is detected, the reference space will be updated and the parametrization will be matched with the new noise model that has generated the noise transition. This matching and this updating shall be explained further below.

If no energy incompatibility is detected, a search is made for spectral incompatibility in the unit 502. The search for spectral incompatibility could have been made first. The order of the searches is of no importance.

To decide on spectral incompatibility, a passage will be made into the frequency domain. For each of the frequency channels i (i as an integer between 1 and Nb), a comparison is made between the spectral coefficient $B_{i,newmod}$ associated with the channel i of the new noise model and the spectral coefficient $B_{i,modcurr}$ associated with the same channel of the current noise model. Each spectral coefficient expresses the spectral energy of all the frames of a noise model in the frequency channel considered.

To obtain the spectral coefficients of a noise model, a Fourier transform is applied to the frames of the noise model so as to obtain a frequency distribution of the amplitude of the noise signals of each of the frames. This amplitude is squared so as to obtain the energy spectrum. The mean energy spectrum of the model is then computed by summing up, for one and the same frequency band, the energy spectra of all the frames and by dividing the sum obtained by the number N of frames of the model. To take account of the particular features of the human auditory system, Nb weighting windows are applied to the mean energy spectrum Nb. These windows are preferably Bark windows, sixteen in number, that reproduce the shape of the filters of the human auditory system so as to obtain the Nb spectral coefficients desired.

The characteristics of Bark windows are well known in the prior art and do not have to be described in further detail. For further details, reference may be made to the work: "La parole et son traitement automatique" (Speech and its Automatic Processing), Calliope, Edition Masson, 1989, and especially p. 268.

It may be added that the first windows, corresponding to the lowest frequencies, have a high amplitude peak and a narrow passband and that the amplitude of the higher-ranking windows decreases while their passband widens. Furthermore, the contiguous windows overlap each other in sets of two.

The ratio is computed between the ith (i as an integer between 1 and Nb) spectral coefficient $B_{i,newmod}$ of the new noise model and the ith spectral coefficient $B_{i,modcurr}$ of the current noise model. These ith spectral coefficients are associated with the frequency channel i. The rule of incompatibility is as follows: if the ratio $B_{i,newmod}/B_{i,modcurr}$ is outside an interval delimited by two thresholds, Sf and Sf', one of which Sf is greater than 1 while the other Sf' is below 1, then there is incompatibility between the two models. A noise transition is detected. The two thresholds Sf and Sf' will be preferably inverted with respect to each other, Sf'=1/Sf. In fact the determining of only one of the two is enough. For example, a typical value is Sf=9 and therefore Sf'=⅑. Similarly as above, the value of the thresholds are matched to minimize the transitions. These will not be significant.

If no incompatibility is detected, the two models are compatible, there is no significant modification of the noise, and no updating of the reference spaces and matching of the parametrizing needs to be done. The new model for its part replaces the current model and will be used for the noise-suppression.

If a spectral incompatibility between models is detected, the reference space will be updated and the parametrization will be adapted to the new noise model that has generated the noise transition. This matching and this updating will be explained here below.

Figure 3B:
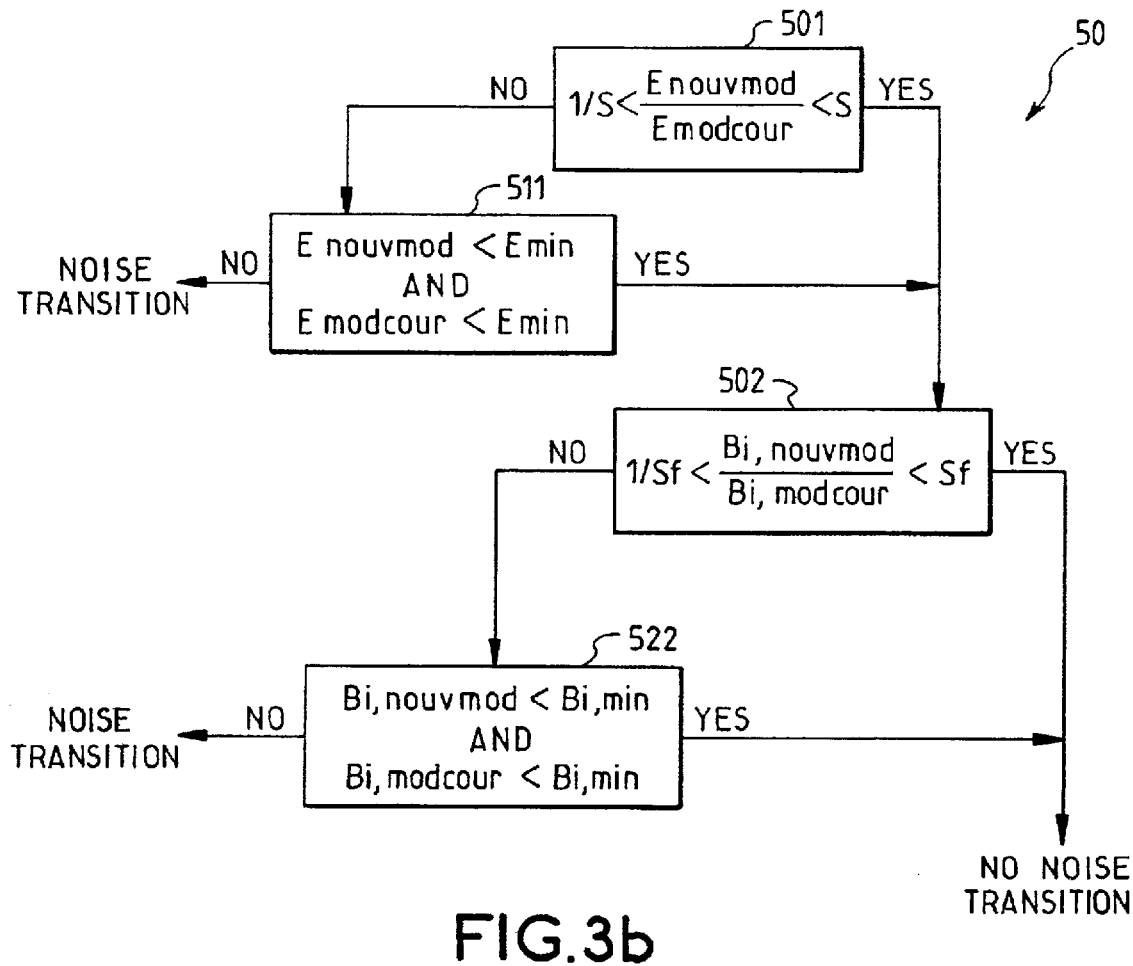

However it is preferable, again with a view to reducing the frequency of the updating operations, to avoid updating operations if the noise of the new model and the noise of the current model are low because, in this situation, they cause little or no hindrance to the voice recognition. Reference is made to FIG. 3b.

It is possible, from this viewpoint, to provide for a comparison, when an energy incompatibility is detected, of the unit 511, the energy value $E_{newmod}$ of the new noise model and the energy value $E_{modcurr}$ of the current noise model with a floor energy threshold $E_{min}$. If the two energy values $E_{newmod}$ and $E_{modcurr}$ are below this minimum energy threshold $E_{min}$, the incompatibility between models is ignored and no updating or matching is done. Indeed, this means that the energy values of the two models are low and have few adverse effects on the voice recognition.

Similarly, it is preferable, when a spectral incompatibility has been detected in one of the frequency channels i, to make a comparison, in the unit 522, of the ith spectral coefficient $B_{i,newmod}$ of the new noise model and the ith spectral coefficient $B_{i,modcurr}$ of the current noise model with an ith minimum spectral coefficient $B_{i,min}$. If the two spectral coefficients $B_{i,newmod}$ and $B_{i,modcurr}$ are smaller than this ith floor spectral coefficient $B_{i,min}$, the incompatibility between models is ignored and no updating or matching is done. Indeed, it means that the spectra of the two models are low and cause little trouble for voice recognition.

Since the voice recognition process takes place in real time, when a new n-ranking noise model is detected while an updating is in progress, a search is made for an incompatibility between the new n-ranking noise model and the n−1 ranking noise model which has become a current noise model and activated the updating. If no incompatibility is found, the updating from the n−1 ranking current noise model is confirmed and the new n-ranking noise model is not taken into account for the updating. It becomes a new noise model for the noise-suppression. If an incompatibility is detected, the updating is cancelled, the parametrizing and the reference space keep the configurations that they had before the updating and the iterative search for new noise models is continued.

We shall now see the way in which the matching of the parametrization is done when a noise transition has been detected and when the speech has been detected. We shall begin with a more detailed explanation of the way in which the parametrization chain 2 works in referring to FIG. 2. Conventionally, the temporal digital frames coming from the noise-suppression unit 6 are processed so as to pass into the frequency field. In the first unit 21, for each useful signal frame, its spectral energy is determined in a certain number of frequency bands. For this purpose, a Fourier transform is applied to the frames so as to obtain a frequency distribution of the amplitude of the signals of each of the frames. This amplitude is squared so as to obtain the energy spectrum.

To take account of the particular features of the human auditory system, Nb weighting windows are applied to the mean energy spectrum Nb. These windows are preferably Bark windows, sixteen in number, that reproduce the shape of the filters of the human auditory system so as to obtain the Nb spectral coefficients desired $B_{i,par}$ with I as an integer ranging from 1 to Nb. It is these spectral coefficients that deliver the unit 21.

The parametrization chain 2 is matched by the computation of an i-ranking robustness operator $OpRob(B_{i,par})$ with a weighting function for each ith spectral coefficient $B_{i,par}$ of a useful frame signal. The unit 200 illustrates the determining of the i-ranking robustness operator $OpRob(B_{i,par})$.

It is a factor ranging from zero to one whose function is to express the confidence attached to a spectral coefficient of the frame with respect to the noise level that has activated the transition. In one and the same frequency channel i, the closer the value of the ith spectral coefficient of a useful signal frame to the value of the ith spectral coefficient of the noise model that has activated the transition, the closer will the value of the i-ranking robustness operator be to 1.

The data elements that play a role in the determining of the robustness operator to be applied are therefore: the value of the ith spectral coefficient of a useful frame signal and the level of the noise in the frequency channel i of the new noise model that has activated the noise transition. For example, the robustness operator may be given by the following relationship:

$$OpRob(B_{i,par}) = \left\{\max\left(0.25 + \frac{B_{i,par} - P(B_{i,newmod})}{B_{i,par} + 2P(B_{i,newmod})}, 0\right)\right\}^2$$

$$OpRob(B_{i,par}) = \left\{\max\left(0.25 + \frac{B_{i,par} - P(B_{i,newmod})}{B_{i,par} + 2P(B_{i,newmod})}, 0\right)\right\}^2$$

Figure 4:
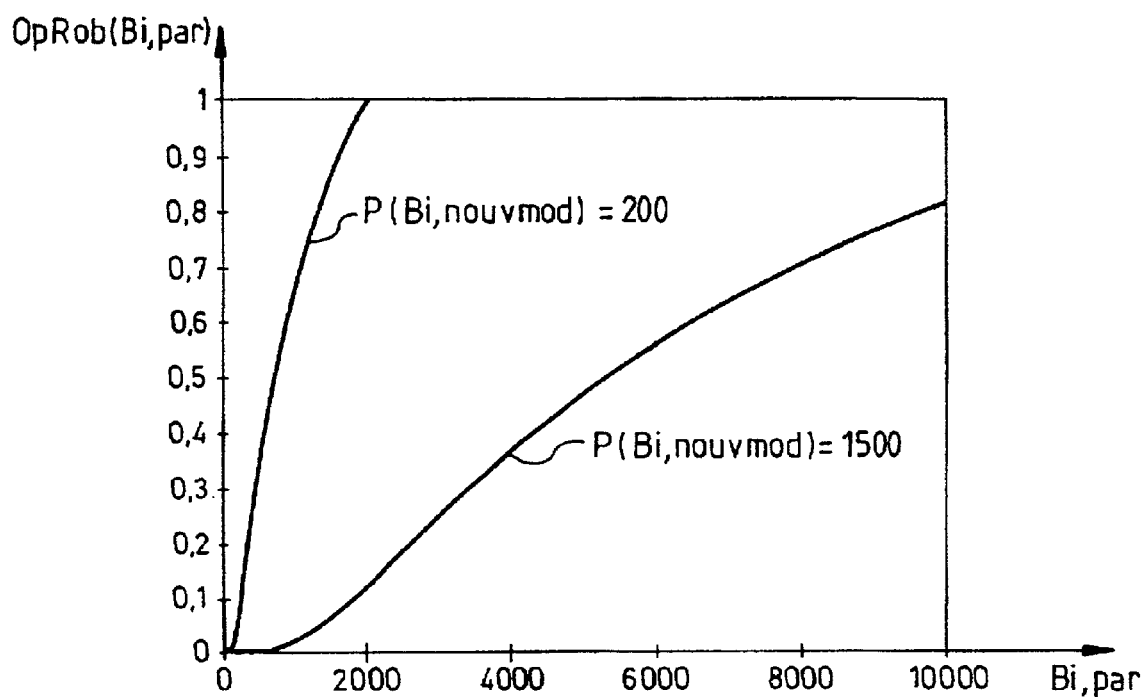
FIG. 4 illustrates the evolution of the robustness operator as a function of the values of the spectral coefficient for two different operator functions.

$B_{i,par}$ being the spectral coefficient of a useful signal frame, $P(B_{i,newmod})$ being a parameter depending on the noise level of the new noise model having activated the transition, in the frequency channel i considered. This parameter governs the shape of the function governing the robustness operator and it varies as the ith spectral coefficient $B_{i,newmod}$ of the noise model having activated the transition. The greater the value of $P(B_{i,newmod})$, the closer will the robustness operator be to zero over a long period. Reference may be made to FIG. 4 which shows the progress of the i-ranking robustness operator as a function of the ith spectral coefficient of a useful frame signal with a parameter $P(B_{i,newmod})$ equal either to 200 or to 1500. For $P(B_{i,newmod})$ equal to 1500, the robustness operator remains at zero so long as the spectral coefficient has not reached about 1000 whereas for $P(B_{i,newmod})$ equal to 200, the robustness operator begins increasing as soon as the spectral coefficient exceeds about 100.

In an example of dependence relevant to the parameter $P(B_{i,newmod})$, it is given the value of the ith spectral coefficient $B_{i,newmod}$ of the new noise model that has activated the transition.

Then, in the unit 210, a robustness operator $OpRob(B_{i,par})$ thus computed is applied to each of the Nb spectral coefficients $B_{i,par}$ coming from the unit 21 so as to weight them. In the unit 22, the Nb spectral coefficients weighted by the robustness operator undergo a compression to take account of the behavior of the human auditory system. Conventionally, this compression may be a logarithmic compression and more particularly a Qlog compression. This Qlog function takes the value zero at the outset instead of minus infinity for a pure logarithmic function, and has a logarithmic behavior for x-axis functions greater than zero. Other choices are of course possible.

The Nb weighted spectral coefficients thus compressed are then converted in a unit 23. A discrete cosine transform may be used for example. The result of the conversion gives, for each useful signal frame, the parameters of the vector of parameters sought. A certain selection can be made because certain weighted spectral coefficients after conversion are not significant. In general, it is chosen to keep only eight parameters which correspond to the ranks 2 to 9. The vector of parameters represents the acoustic signal of the frame.

Figure 5:
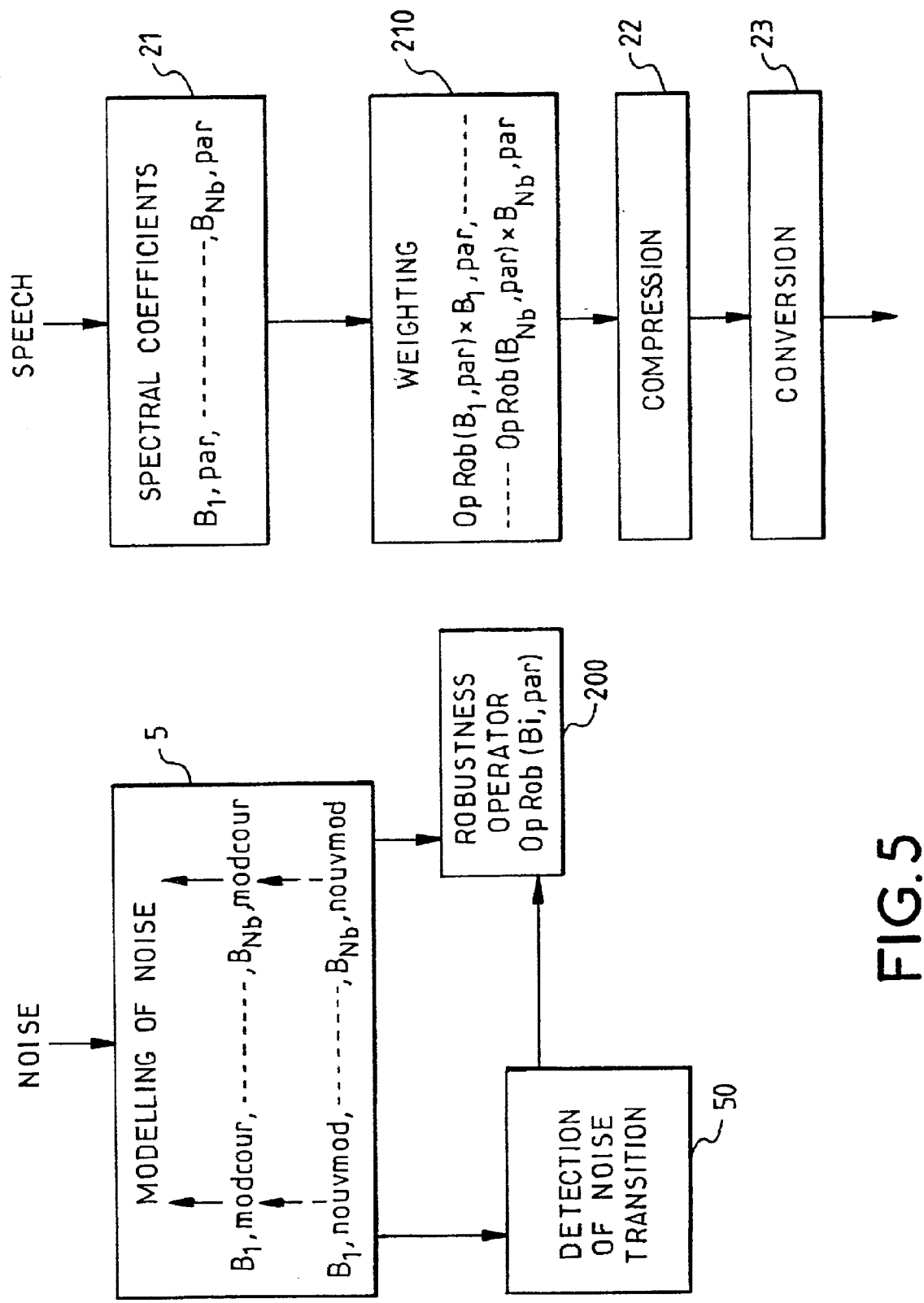
FIG. 5 provides a detailed illustration of an exemplary parametrization chain of the voice-recognition system according to the invention.

FIG. 5 gives a view, in the form of units, of the parametrization chain in the voice-recognition method of the invention. Its level of robustness is matched to the noise.

The reference space must be updated so that the shape-recognition phase is performed coherently between the vectors of parameters matched to the noise and the references modified accordingly.

Referring again to FIG. 2, the reference space is updated as soon as a noise transition has been detected. This updating phase 33, which may last a few seconds, must disturb the voice-recognition process as little as possible. It is sought to obtain a situation where this updating phase is transparent to the user of the voice-recognition system.

In the example described, it is assumed that the references of the reference space express the contents of commands, namely words or sentences, and that they take the form of series of vectors of basic parameters corresponding to sequences of basic frames. Each word can be described by one or more references as a function of the pronunciation of the speaker or speakers. The reference space 32 may contain thousands of references.

The shape recognition is done by assessment of a series of vectors of parameters coming from the parametrization, corresponding to the acoustic fingerprint of an analyzed command to be recognized with respect to a series of vectors of basic parameters obtained during the learning phase, this series corresponding to the acoustic fingerprint of a basic command. From this assessment, a deduction is made of a distance between the analyzed command and the reference command. The reference command having the shortest distance with the analyzed command represents the command to be recognized.

To obtain this shape-recognition phase, an algorithm, for example a DTW type algorithm, is performed.

Since the shape recognition is done by comparison between vectors of parameters, it is necessary to have these basic vectors of parameters available. They are obtained in the same way as for the useful signal frames by the computation, for each basic frame, of its spectral energy in a certain number Nb of frequency channels and by the use of weighting windows. The energy values obtained are the Nb basic spectral coefficients $B_{i,base}$ sought with i as an integer ranging from 1 to Nb. After detection of a noise transition, to update the reference space, an i-ranking robustness operator $OpRob(B_{i,base})$ is computed in the unit 300 for each ith basic spectral coefficient $B_{i,base}$. As above, the function of this operator is to weight the parameter as a function of its value and the noise level of the noise model that has activated the updating in the frequency channel considered. As an illustration, the robustness operator may be given by the following relationship:

$$OpRob(B_{i,base}) = \left\{\max\left(0.25 + \frac{B_{i,base} - P(B_{i,newmod})}{B_{i,base} + 2P(B_{i,newmod})}, 0\right)\right\}^2$$

$$OpRob(B_{i,low}) = \left\{\max\left(0.25 + \frac{B_{i,low} - P(B_{i,newmod})}{B_{i,low} + 2P(B_{i,newmod})}, 0\right)\right\}^2$$

with $B_{i,base}$ as the ith basic spectral coefficient of a basic frame of references, $P(B_{i,newmod})$, a parameter depending on the noise level that has activated the transition in the frequency channel i considered.

As above, in an example of dependence relevant to the parameter $P(B_{i,newmod})$, it is given the value of the ith spectral coefficient $B_{i,newmod}$ of the new noise model that has activated the transition.

An operator of this kind is applied to the Nb basic spectral coefficients of all the references so as to obtain the weighted basic spectral coefficients. The number of possible values for the basic spectral coefficients is far smaller than the number of references. For the application to aircraft, it is in the range of 300.

The weighted basic spectral coefficients are then compressed, for example as above with the function Qlog. The weighted basic spectral coefficients thus compressed are then converted. A discrete cosine transform can be used for example. The result of the conversion gives, for each frame, its vector of parameters adapted to the noise. These updated vectors of parameters contribute to the updating of the references.

A first memory space is provided to store the updated references and a second memory space is provided to store the current references as shall be explained here below in the description of FIG. 6 which illustrates a variant of the updating of the reference space.

To optimize the speed of the updating of the reference space, it may be necessary to simultaneously perform the weighting of the spectral coefficients of the references by the robustness operator and the compression of the weighted spectral coefficients.

Figure 6:
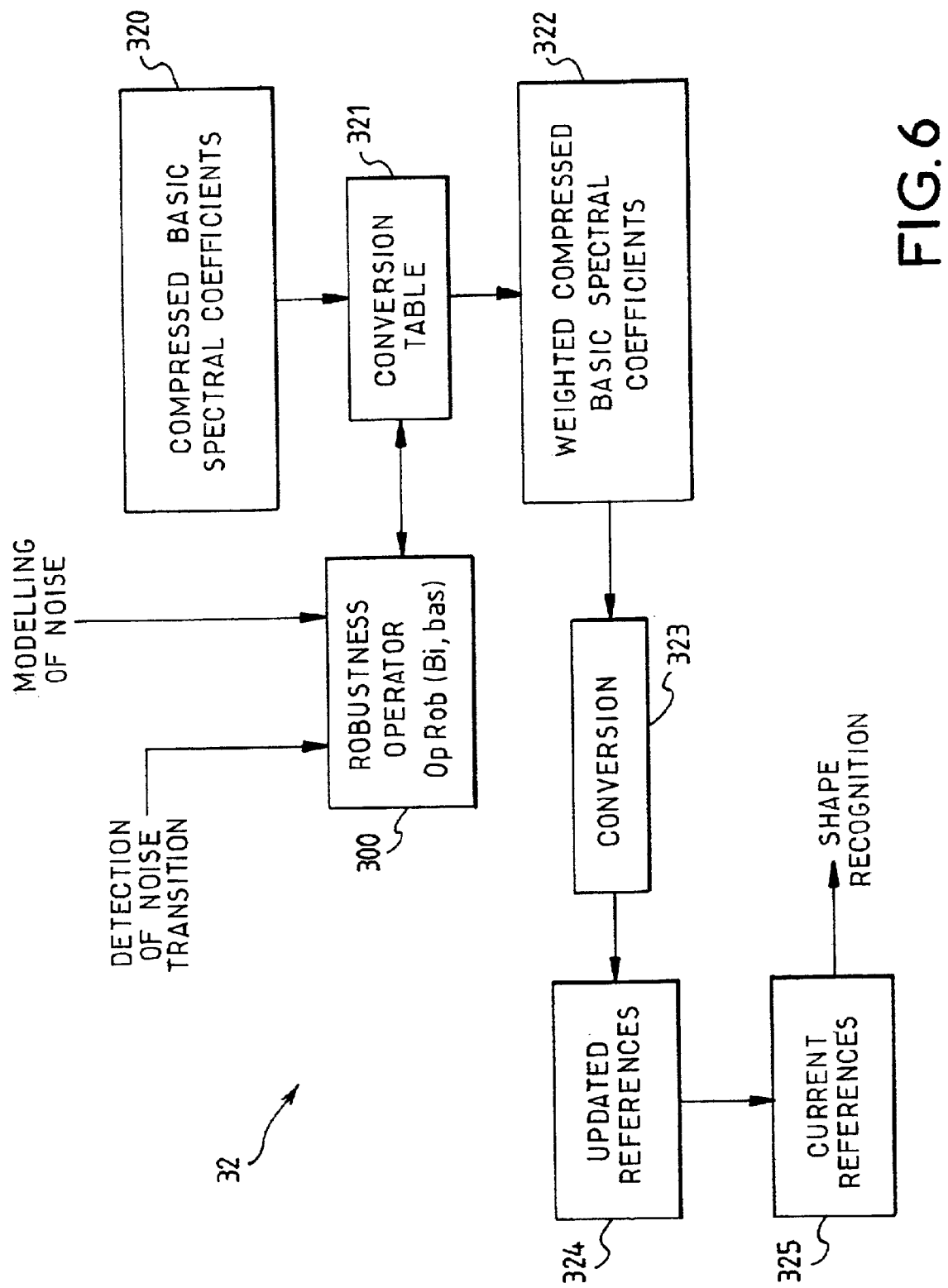
FIG. 6 illustrates an exemplary updating of the reference space of the voice-recognition system according to the invention.

Reference is made to FIG. 6. In a memory zone 320 of the reference space 32, at the end of the preliminary learning phase, a set of compressed basic spectral coefficients is kept. They are obtained from the learning phase and come from all the possible commands in the application considered. This set remains fixed during the different updating operations. The number of possible values for the compressed basic spectral coefficients is small, in the range of 300 for example in the application to aircraft.

A conversion table 321 is provided, used to pass from the set of compressed basic spectral coefficients to a set of compressed basic spectral coefficients weighted by the robustness operator. For the range of values of the set of possible compressed spectral coefficients of the zone 320, this table contains its reverse by the application of the reverse of the compression function that forms a set of basic spectral coefficients. This set of non-compressed basic spectral coefficients is also fixed during different updating operations.

For each ith non-compressed basic spectral coefficient of the set, it is possible, in the unit 300, to compute the i-ranking robustness operator as a function of the new noise model that has generated the noise transition and the basic spectral coefficient. A weighting is done, in the conversion table 321, of the non-compressed spectral coefficients of the set with the computed robustness operators and a compression is made to obtain a set of compressed and weighted spectral coefficients, namely coefficients that are updated. This set is stored in a memory space 322.

With this set of compressed and updated spectral coefficients, it is possible to carry out the conversion 323 to obtain the parameters of the vectors of parameters and the updated references of the reference space 32. They are stored in a memory zone 324. They correspond in this example to sequences of frames and therefore to sequences of vectors of parameters.

Initially, the basic references coming from the learning operation are stored in a memory zone 325. They form the current references and are used in the shape-recognition phase so long as a noise transition has not been detected and an updating has not been performed. As soon as an updating operation is terminated, the current references are replaced by the updated references. They are used in the shape-recognition phase so long as they not replaced by new updated references.

If a speech signal comes into operation during the phase of updating the reference space, the shape-recognition phase is done with the current references which are always available and the updating is suspended. The updating processing operation therefore does not delay the voice recognition. With a modern processor architecture, for example of the "power PC. 750" type, the updating of the reference space takes less than 10 seconds.

Figure 7:
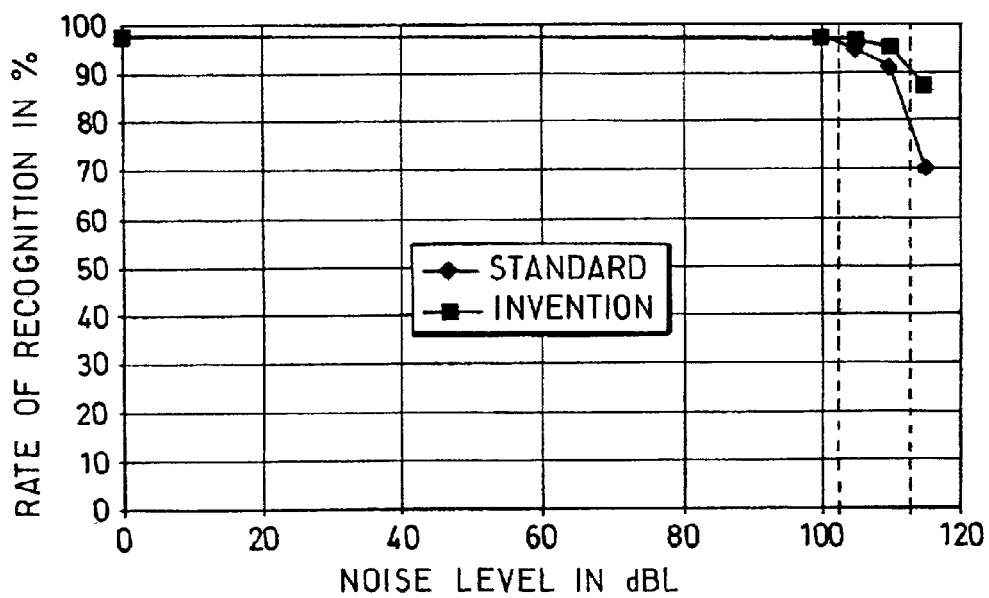
FIG. 7 is a graph to compare the rate of voice recognition as a function of the noise with, firstly, a standard voice-recognition system and, secondly, the voice-recognition system according to the invention.

With a syntax involving about 120 words and about one million possible sentences to be recognized, the comparisons made between a standard voice-recognition system such as the one of FIG. 1b and the system according to the invention can be used to plot graphs illustrated in FIG. 7. It is assumed that the application is one used in the cockpit of an aircraft where the speakers have helmets and masks. The x-axis shows the level of ambient noise in decibels and the y-axis shows the rate of voice recognition. The noise range identified between the lines of dashes corresponds to the noise in flight. From these graphs, it can be deduced that the voice-recognition system according to the invention halves the error rate in environments with the greatest amount of noise.

The above description of the updating of the reference space is based on a reference space adapted to shape recognition by computation of minimum distance. The method according to the invention can also be applied to a shape-recognition phase that uses probabilities. The shape-recognition phase then uses an HMM type algorithm. There is a slight difference here because the references are Gaussian functions, each associated with a phoneme and not with series of vectors of parameters. These Gaussian functions are characterized by their center and their standard deviation. This center and standard deviation depend on the parameters of all the frames of the phoneme, namely on the compressed spectral coefficients of all the frames of the phoneme.

The updating is again done by applying an i-ranking robustness operator to each basic spectral coefficient of a basic frame coming from the learning process. On the basis of the weighted and compressed basic spectral coefficients, it is possible to prepare the centers and standard deviations of the updated Gaussian functions and hence of the updated references. The variant shown in FIG. 6 can also be used, provided an appropriate conversion is made, to go from the compressed and weighted basic spectral coefficients to the updated references.

From the reading of the above description, it will be seen that the voice-recognition system that has just been described works optimally in all conditions of noise through the presence of the robustness operator. It is therefore operational both in laboratory conditions and in an automobile or in aircraft. It is an autonomous system had has several applications.

By implementing the spectral processing of noise, since the robustness operator associated with a frequency channel in which the noise is high will be different from the robustness operator associated with a frequency channel in which the noise is low, an optimal level of robustness and sensitivity are obtained whatever the sound environment. Owing to the weighting, the frequency channels in which the noise is very high will have minimized importance in the determining of the parameters.

For the user, the establishment of the system causes no additional cost. The learning phase is not modified as compared with the previous system from the user's viewpoint. Only the basic spectral coefficients or the compressed basic spectral coefficients are kept in memory, if the variant enabling the acceleration of the updating operation is used.

In the recognition phase, the phase of detection of transition and the phase of updating the reference space are performed in the absence of speech to be recognized when the processor is not busy. If the speech comes into play during an updating operation, the updating is interrupted. These processing operations do not increase the response time of the system.

The only constraint dictated by the implementation of the method is that it requires more memory space, firstly to store the basic spectral coefficients whether they are compressed or not and secondly to store the references, namely the current references as well the updated references. In the prior art, a single memory space was sufficient for the references. These constraints are truly limited.

What is claimed is:

1. A method of voice recognition in a noise-ridden acoustic signal comprising:
   a step of digitizing and subdividing the noise-ridden acoustic signal into a sequence of temporal frames;
   a step of parameterizing speech-containing temporal frames so as to obtain a vector of parameters, per speech containing frame, in the frequency domain, the vector of parameters expressing the acoustic contents of each speech containing frame;
   a shape-recognition step in which the vectors of parameters are assessed with respect to references prerecorded in a reference space during a preliminary learning step, so as to obtain recognition by the determining of at least one reference which is closest to the vector of parameters;
   a step of reiterative searching for successive noise models in the sequence of temporal frames, a new noise model replacing a current noise model, each noise model comprising several successive frames;
   a step of searching for a noise transition between the new noise model and the current noise model; and wherein, when the noise transition has been detected, the method comprises a step of updating the reference space as a function of the new noise model, the parameterizing step including a step of matching the parameters to the new noise model.

2. A method of voice recognition according to claim 1, wherein the step of searching for a noise transition comprises a step of searching for an energy incompatibility and/or a step of searching for a spectral incompatibility between the new noise model and the current noise model, the detection of an incompatibility expressing a noise transition.

3. A method of voice recognition according to claim 2, wherein the step of searching for an energy incompatibility comprises a comparison of the ratio between a mean energy $E_{newmod}$ of the new noise model and a mean energy of the current noise model $E_{modcurr}$ with a low threshold S' and a high threshold S, an energy incompatibility being found if the ratio is outside the interval delimited by the two thresholds S, S'.

4. A method of voice recognition according to claim 3, wherein the step of searching for an energy incompatibility also comprises a comparison of the mean energy $E_{newmod}$ of the new noise model and the mean energy of the current noise model $E_{modcurr}$ with an energy floor threshold $E_{min}$ below which the noise is negligible, the energy incompatibility determined by the comparison of the ratio between the mean energy of the new noise model $E_{newmod}$ and the mean energy of the current noise model $E_{newcurr}$ being ignored when the mean energy of the new noise model $E_{newmod}$ and the mean energy of the current noise model $E_{modcurr}$ are both below the energy floor threshold $E_{min}$.

5. A method of voice recognition according to claim 2, wherein the step of searching for spectral incompatibility comprises, on the basis of spectral coefficients $B_{i,modcurr}$ $B_{i,newmod}$ respectively expressing a spectral energy of the frames of the current noise model and a spectral energy of frames of the new noise model in at least one frequency channel i, a comparison of the ratio between the spectral coefficient $B_{i,newmod}$ associated with the frequency channel i of the new noise model and the spectral coefficient $B_{i,modcurr}$ associated with the same frequency channel i of the current noise model with a low threshold Sf and a high threshold Sf, a spectral incompatibility being found if the ratio is located outside the interval delimited by the two thresholds, Sf, Sf.

6. A method of voice recognition according to claim 5, wherein the step of searching for a spectral incompatibility also comprises, for at least one frequency channel i, a comparison of the spectral coefficient $B_{i,newmod}$ of the new noise model in the frequency channel i and of the spectral coefficient $B_{i,modcurr}$ of the current noise model in the frequency channel i with a floor spectral coefficient $B_{i,min}$ associated with the frequency channel i, namely a floor below which the noise is negligible, a spectral incompatibility determined by the comparison of the ratio between spectral coefficients being ignored when, for the frequency channel i, the spectral coefficients of the new noise model and of the current noise model are both below the floor spectral coefficient $B_{i,min}$.

7. A method of voice recognition according to claim 1, wherein the parameterizing step comprises a step of determining spectral coefficients $B_{i,par}$, each associated with a frequency channel i each expressing a representation of a spectral energy of a frame containing speech in the frequency channel i, the parameter-matching step comprising a determining, for each spectral coefficient $B_{i,par}$, of a robustness operator $OpROb(B_{i,par})$, the robustness operator expressing the confidence to be attached to the spectral coefficient $B_{i,par}$ with respect to the noise level of the new noise model in the same frequency channel i, a weighting of the spectral coefficient $B_{i,par}$ with the robustness operator $OpROb(B_{i,par})$, and a determining of the vector of parameters on the basis of the weighted spectral coefficients.

8. A method according to claim 7, wherein the robustness operator $OpROb(B_{i,par})$ verifies the following relationship:

$$OpRob(B_{i,par}) = \left\{ \max\left( 0.25 + \frac{B_{i,par} - P(B_{i,newmod})}{B_{i,par} + 2P(B_{i,newmod})}, 0 \right) \right\}^2$$

$B_{i,par}$ being the spectral coefficient and $P(B_{i,newmod})$ being a parameter dependent on the noise level of the new noise model having activated the transition in the frequency channel i.

9. A method of voice recognition according to claim 1, further comprising a reference space updating step comprising the following operations, on the basis of basic spectral coefficients each associated with a frequency channel i, each expressing a spectral energy of a basic frame obtained during the learning phase step:

the determining of a robustness operator $OpRob(B_{i,base})$ for each basic spectral coefficient $B_{i,base}$, the robustness operator expressing the confidence to be attached to the basic spectral coefficient $B_{i,base}$ with respect to a noise level of the new noise model in the same frequency channel i, a weighting of the basic spectral coefficients $B_{i,base}$ with the respective robustness operators $OpROb(B_{i,base})$, and preparation of the updated references with the weighted basic spectral coefficients.

10. A method according to claim 9, wherein the robustness operator $OpROb(B_{i,base})$ for the updating of the reference space verifies the following relationship:

$$OpRob(B_{i,base}) = \left\{\max\left(0.25 + \frac{B_{i,base} - P(B_{i,newmod})}{B_{i,base} + 2P(B_{i,newmod})}, 0\right)\right\}^2$$

$B_{i,base}$ being the basic spectral coefficient and $P(B_{i,newmod})$ being a parameter depending on the noise level of the new noise model having activated the transition, in the frequency channel i.

11. A method according to claim 9, in which the references are prepared on the basis of compressed basic spectral coefficients, wherein the method uses a conversion table to convert the compressed basic spectral coefficients into compressed and weighted basic spectral coefficients.

12. A method according to claim 11, wherein the conversion table contains the non-compressed basic spectral coefficients $B_{i,base}$ obtained by application of a reverse of the compression function to the compressed basic coefficients and wherein the method comprises: p1 a determining the robustness operator OPROb($B_{i,base}$) for each of the non-compressed basic spectral coefficients $B_{i,base}$, a weighting of the non-compressed basic spectral coefficients $B_{i,base}$, a compression of the non-compressed and weighted basic spectral coefficients so as to obtain the compressed and weighted basic spectral coefficients.

13. A method according to claim 1, using, as references, a sequence of temporal frames corresponding to one or more words, the sequence of frames being identified by a series of vectors of parameters, said parameters being obtained by compression of spectral coefficients.

14. A method according to claim 1, using, as references, a sequence of temporal frames corresponding to one or more phonemes, said sequence of frames being identified by a center and a standard deviation of a Gaussian function, said center and said standard deviation depending on the parameters of the vectors of parameters of the frames.

15. A method according to claim 1, comprising a step of noise-suppression in the speech-containing temporal frames before the parameterizing step.

16. A system of voice recognition in a noise-ridden acoustic signal comprising:
 means to acquire the noise-ridden acoustic signal, digitize the noise-ridden acoustic signal and subdivide the noise-ridden acoustic signal into temporal frames;
 a parametrization chain to translate the temporal frames containing speech into vectors of parameters in the frequency domain;
 shape-recognition means with a reference space having references acquired during a learning stage, to compare the vectors of parameters coming from the parametrization chain with the references, so as to obtain recognition by the determination of a reference that most closely approaches the vectors of parameters;
 means for modeling the noise to reiteratively prepare noise models, a new noise model replacing a current noise model;
 means for detecting a noise transition between the new noise model and the current noise model;
 means to match the parametrization chain with the new noise model having activated the noise transition; and
 means to update the references of the reference space as a function of a noise level of the new noise model having activated the noise transition.

17. A system of voice recognition according to claim 16, wherein the means used to update the references of the reference space comprise a first memory space to store the updated references, said updated references having to replace current references used for shape recognition before the detection of the noise transition, said current references being stored in a second memory space.

18. A voice-recognition system according to claim 16, comprising a memory space to store compressed basic spectral coefficients obtained from basic spectral coefficients each associated with a frequency channel i, said basic spectral coefficients each expressing the spectral energy of a basic frame coming from the learning stage, a conversion table to convert the compressed basic spectral coefficients into compressed and weighted basic spectral coefficients, each weighted by a robustness operator OpROb($B_{i,base}$) as a function of the noise level of the new noise model having activated the noise transition and of the basic spectral coefficient ($B_{i,base}$) to be weighted, said compressed and weighted basic spectral coefficients being used for the updating of the references of the reference space.

19. A voice-recognition system according to claim 16, comprising means for noise-suppression in the speech-containing temporal frames before the speech containing temporal frames are translated by said parametrization chain.

* * * * *